Aug. 7, 1928.

F. F. FOWLE 1,679,518

COMPOSITE METAL PRODUCT

Filed Aug. 28, 1924

Inventor:
Frank F. Fowle,
By Wilkinson, Huxley, Byron & Knight
attys

Witness:
R. Burkhardt

Patented Aug. 7, 1928.

1,679,518

UNITED STATES PATENT OFFICE.

FRANK F. FOWLE, OF CHICAGO, ILLINOIS.

COMPOSITE-METAL PRODUCT.

Application filed August 28, 1924. Serial No. 734,554.

In a copending application Serial No. 727,162, filed July 21, 1924, I have disclosed a method of making composite metal ingots.

Preferably the ingot is made of two metals, one being copper or some other metal having the quality of high electrical conductivity and the other being iron or steel or some other metal having the quality of relatively great mechanical strength. Preferably the ingot has a copper core, a relatively thin shell of iron or steel surrounding the copper, and iron or steel cast around said thin shell, the shell being a spacing medium between the copper and main body of iron or steel to assist in retaining the form and shape of the copper while the iron or steel is in molten condition and to prevent possible alloying action of the hot iron or steel on the copper.

The copper or metal of lower melting point is poured first and the iron or steel or metal of higher melting point is poured last. The melting point of the metal comprising the shell or spacing medium should be at least as high as the melting point of the metal having the higher melting point and should have characteristics approaching or generally similar to the metal having the higher melting point. These ingots are reheated and then hot-rolled into various shapes to form different composite metal products including sheets and bars and the like, and additionally are cold-drawn to form other composite metal products such as steel-covered copper wire or copper-covered steel wire.

The shell or blank which spaces the two metals in question also acts as a bond in common for same.

One object of the present invention is to provide composite metal products or articles of manufacture consisting chiefly of two metals and a bonding metal or medium interposed therebetween, one of said two metals chosen for its advantageous electrical conducting properties and the other for its advantageous mechanical properties.

Another object is to provide composite metal products or articles of manufacture consisting chiefly of two dissimilar metals and a bonding metal therebetween adapted to meet various requirements in connection with several uses.

These and other objects are accomplished by means of the composite metal products disclosed on the accompanying sheet of drawings, in which—

The various novel features of the invention will be apparent from the following description and drawings and will be particularly pointed out in the appended claims.

Figure 1:
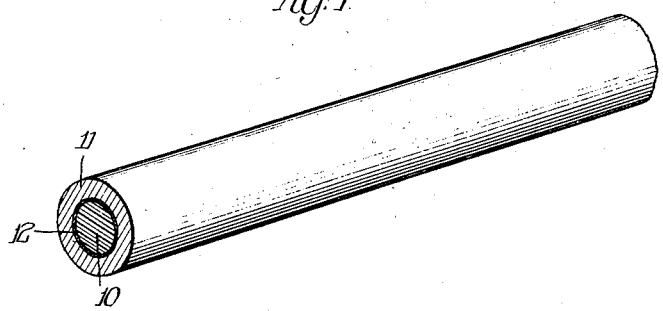
Figure 1 is a fragmentary perspective view of a composite electrical conductor in the form of a wire.

Referring particularly to Figure 1, it will be noted that I have disclosed a composite metal electrical conductor consisting chiefly of two different metals having different characteristics, one of said metals 10 being copper and forming the core of an electrical conductor and the second being iron or steel 11 and forming the outer covering of the conductor. A bonding metal 12 is interposed between the copper 10 and iron or steel 11. Copper is chosen because of its quality of high electrical conductivity and the iron or steel is chosen because of its relatively great mechanical strength. Also it is preferable that the metal 11 be steel or some other metal having the quality of low magnetic permeability and in which the "skin effect" is reduced to a minimum. As described in my copending application Serial No. 723,863, filed July 3, 1924, steel containing at least as much as thirty hundredths percent of chemically combined carbon is preferable and as a matter of fact, the best results are obtained with steel containing in the neighborhood of seventy-hundredths percent of chemically combined carbon.

As mentioned in my copending application Serial No. 727,162, filed July 21, 1924, the shell or blank interposed between the copper and steel in the ingot has a melting point substantially not lower than the melting point of the metal having the higher melting point of the two metals in question; or in other words, the melting point of the shell or blank is substantially the same as the melting point of the iron or steel in the ingot. Furthermore, the melting point of the shell or blank is higher than the melting point of the copper in the ingot and the copper or metal of lower melting point is cast first with respect to the blank or shell and the iron or steel cast last with respect to the shell or blank to retain the form of the copper while the steel is in condition and to prevent alloying action of hot steel on the copper.

As mentioned above, the ingot after being reheated is hot-rolled and when it is desired to make a wire from the ingot, the latter additionally is cold-drawn. Such a wire or electrical conductor is shown in Figure 1 of the drawings in this present application and the metal 12 accordingly, which forms the bonding metal between the copper 10 and the iron or steel 11, is iron or steel or has characteristics approaching or generally similar to the iron or steel or metal having the higher melting point of the two chief metals in question. It will be appreciated that the metals 10 and 11 may be reversed in position so that instead of having a steel-covered copper wire a copper-covered steel wire may be provided, but in either case the bonding metal 12 will be used.

Figure 2:
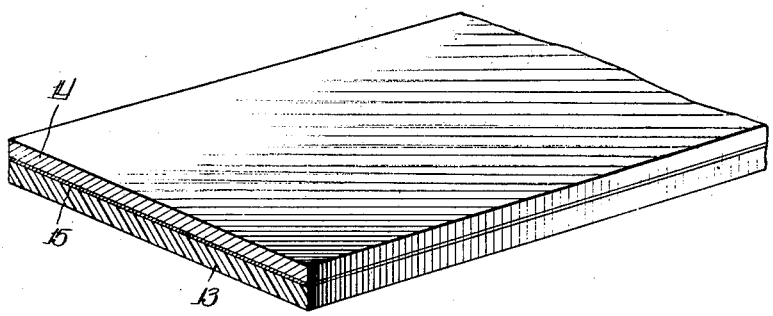
Figure 2 is a fragmentary perspective view of a composite conductor in the form of a plate.

In Figure 2 of the drawings, there is disclosed another composite metal product or conductor in the form of a plate, the copper element of the plate being shown at 13, the iron or steel element of the plate being shown at 14 and the bonding metal being shown at 15.

Figure 3:
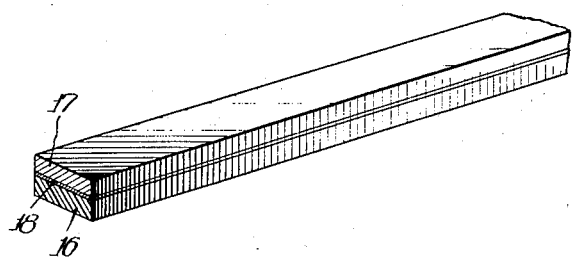
Figure 3 is a fragmentary perspective view of a composite electrical conductor in the form of a bar.

In Figure 3 the composite metal product or conductor is in the form of a bar in which the copper 16 forms the lower layer, the iron or steel 17 the upper layer and the bonding metal 18 the intermediate layer. It will be appreciated that any number of layers may be provided, it being understood that the layer of metal chosen for its quality of good electrical conductively will be spaced from the metal chosen for its relatively great mechanical strength by the bonding metal, the characteristics of which are generally similar to the characteristics of the metal having the higher melting point of the two metals.

It is my intention to cover all modifications falling within the spirit and scope of the following claims.

I claim:

1. A composite electrical conductor comprising two metals and a bonding metal therebetween, one of said two metals being copper for good electrical conductivity and the other being steel for strength and containing at least as much as thirty-hundredths percent content of chemically combined carbon for minimizing magnetic permeability, said bonding metal also being steel to prevent alloying action of hot steel on the copper during the pouring operation of the metals.

2. A composite metal product comprising two different metals having different melting points and a bonding metal interposed between same and having a melting point substantially not lower than the melting point of the metal having the higher melting point, said metal having the higher melting point containing at least as much as thirty-hundredths percent content of chemically combined carbon for minimizing magnetic permeability.

Signed at Chicago, Illinois, August, 1924.

FRANK F. FOWLE.